J., W. & G. Gardner,
Turning Ovals.

Nº 20,705. Patented June 29, 1858.

UNITED STATES PATENT OFFICE.

J. GARDNER, W. GARDNER, AND G. GARDNER, OF NEW YORK, N. Y.

LATHE FOR TURNING OVAL FRAMES.

Specification of Letters Patent No. 20,705, dated June 29, 1858.

*To all whom it may concern:*

Be it known that we, JOHN GARDNER, WILLIAM GARDNER, and GEORGE GARDNER, all of the city and State of New York, have invented a new and useful Improvement in Lathes for Turning Circular and Oval Moldings; and we do hereby declare the following to be a full, clear, and exact description of the same, reference being had to the accompanying drawing and to the letters of reference marked thereon.

Our invention relates to a mode of rapidly manufacturing oval picture frames; and consists in the application of two revolving cutters to the frame, while the latter is caused to revolve in an oval path, the said cutters being so arranged, as to act simultaneously, one cutter to form the molding on the outside, and the other to form the molding on the inside of the frame, as fully set forth hereafter.

In order to enable others skilled in the art to make and use our invention, we will now proceed to describe its construction and operation.

Figure 1:
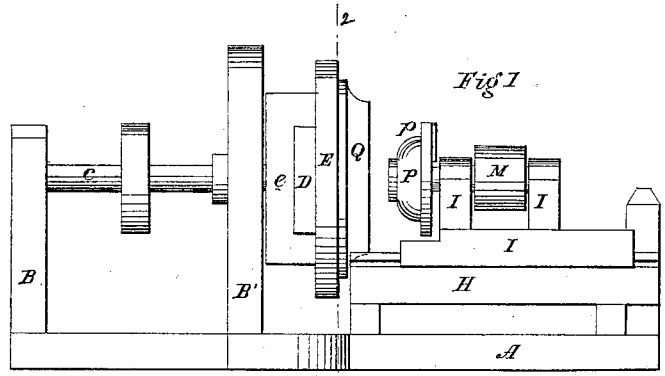
Figure 2:
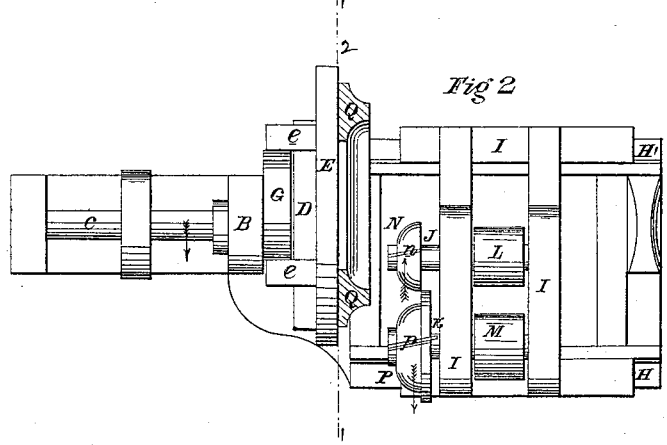
Figure 3:
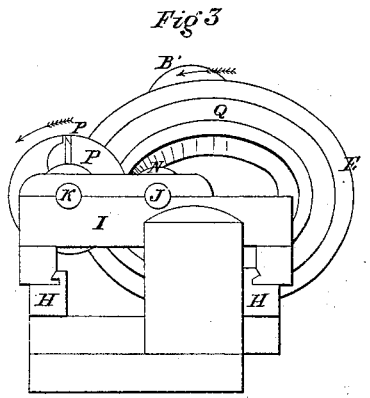
Figure 4:
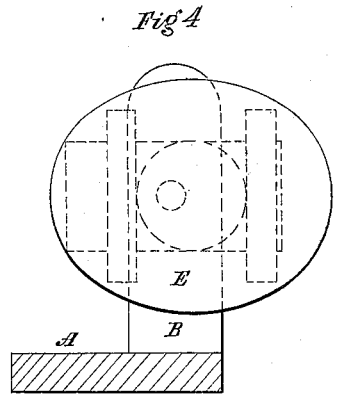

On reference to the accompanying drawing, which forms a part of this specification: Figure 1 is an exterior elevation of our improved lathe as adapted to turning oval moldings. Fig. 2 a plan view of the same, with the molding in section. Fig. 3 an end view, looking in the direction of the arrow (Fig. 1). Fig. 4 a transverse section on the line 1, 2, (Figs. 1 and 2).

A represents the base plate of the lathe, B and B' the uprights for the spindle C, to the end of which is secured the bar D.

E is the face plate, having at the back permanent projections $e, e$, which are arranged to fit over and slide freely on the bar D. Between the projections $e, e$, and secured to the face of the upright B' is a disk G, situated eccentrically with the center of the spindle C. The above parts form what is known as the "eccentric chuck" for turning ovals, and as the device forms no part of our present invention, a further description of its construction or allusion to its operation will be unnecessary. On the guides H and H', secured to the base plate A, slides the frame I, in which turn the two spindles J and K, furnished with pulleys L and M, around which passes a strap from a pulley on any adjacent driving shaft. To the shaft J is secured the circular cutting block N, and to the shaft K the circular cutting block P, the former cutting block being furnished with an oblique cutter $n$, and the latter block with an oblique cutter $p$. It should be understood, that both the blocks and their cutters are of the same form as the required molding, the cutters, however protruding slightly beyond their blocks. Both cutters are so situated, as regards the molding Q, that the cutter J shall operate upon the inside and the cutter P upon the outside of the said molding.

The spindle C, being caused to revolve slowly in the direction of the arrow, will impart an oval revolving motion to the face plate E and to the molding Q, which, prior to the action of the cutters on the same, consisted of a crude block of wood. The frame I is now pushed forward, and the cutters (revolving at a rapid speed) are brought to bear upon the crude block, so as to reduce it at once to the desired figure, the exterior cutter $p$ being so formed as to shape the top of the molding. By thus allowing the face plate to revolve slowly, and the cutters at a rapid rate, greater exactitude and a cleaner cut are obtained, than by the usual plan of allowing the molding to revolve at a rapid rate against stationary cutters.

We neither claim the device for obtaining the eccentric motion of the frame, nor causing the cutters as well as the frame to revolve, but

We claim and desire to secure by Letters Patent—

Constructing oval picture frames by the application of the revolving cutters N and P to the frame Q, when the latter is caused to revolve in an oval path, and when the cutters are so arranged as to act simultaneously, one cutter to form the inside, and the other cutter the outside molding of the frame, as herein set forth.

In testimony whereof, we have signed our names to this specification before two subscribing witnesses.

JOHN GARDNER.
WILLIAM GARDNER.
GEORGE GARDNER.

Witnesses:
E. ALVOID,
JOHN MYERS.